United States Patent
Chao et al.

(10) Patent No.: US 12,531,729 B2
(45) Date of Patent: Jan. 20, 2026

(54) SYSTEMS AND METHODS FOR VALIDATING THE AUTHENTICITY OF DEVICES USED IN INFORMATION HANDLING SYSTEMS

(71) Applicant: Dell Products, L.P., Round Rock, TX (US)

(72) Inventors: Ching-Yun Chao, Austin, TX (US); Andrew Nepogodin, Round Rock, TX (US); Sisir Samanta, Round Rock, TX (US); Jason Davidson, Albany, OR (US); Dominique Prunier, Montreal (CA); Bridget Cate, Taylors, SC (US); Elie Antoun Jreij, Pflugerville, TX (US); Yun Zhang, Shanghai (CN); Shibi Panikkar, Bangalore (IN); Maleravalappil Abdulla Mohammad Sadiq, Round Rock, TX (US); Vaijayanti Joshi, Westborough, MA (US)

(73) Assignee: Dell Products, L.P., Round Rock, TX (US)

( * ) Notice: Subject to any disclaimer, the term of this patent is extended or adjusted under 35 U.S.C. 154(b) by 247 days.

(21) Appl. No.: 18/340,997

(22) Filed: Jun. 26, 2023

(65) Prior Publication Data
US 2024/0430082 A1    Dec. 26, 2024

(51) Int. Cl.
*H04L 9/08*    (2006.01)
*H04L 9/30*    (2006.01)

(52) U.S. Cl.
CPC ............... *H04L 9/088* (2013.01); *H04L 9/30* (2013.01)

(58) Field of Classification Search
CPC .................................. H04L 9/088; H04L 9/30
See application file for complete search history.

(56) References Cited

U.S. PATENT DOCUMENTS

| | | | |
|---|---|---|---|
| 2017/0300916 A1* | 10/2017 | Phillips | G06Q 20/4014 |
| 2018/0343237 A1* | 11/2018 | Wiseman | H04L 63/0853 |
| 2019/0050860 A1* | 2/2019 | Phillips | G06Q 20/38215 |
| 2019/0102555 A1* | 4/2019 | Novak | H04L 9/3268 |

(Continued)

*Primary Examiner* — Yonas A Bayou
(74) *Attorney, Agent, or Firm* — Fogarty LLP

(57) ABSTRACT

According to embodiments of the present disclosure, systems and methods for validating the authenticity of devices used in information handling systems (IHSs) are provided. According to one embodiment, an IHS includes a replacement/repaired device to be configured in a computing system, and computer-executable instructions to receive a to-be-replaced public key of a to-be-replaced/repaired device configured in the computing system, sign, using a replacement/repaired device private key of the replacement/repaired device, attestation data of the replacement/repaired device, and sign, using a vendor private key of a vendor of the replacement/repaired device, the signed attestation data and a replacement/repaired device public key of the replacement/repaired device. The instructions then encrypt, using the received to-be-replaced public key, the signed attestation data and the replacement/repaired device public key, and sign, using a vendor private key, the encrypted data to save into a new voucher that pairs the to-be-replaced/repaired device with the replacement/repaired device.

20 Claims, 6 Drawing Sheets

(56) References Cited

U.S. PATENT DOCUMENTS

| | | | |
|---|---|---|---|
| 2021/0110026 A1* | 4/2021 | Liu | G06F 21/33 |
| 2023/0130256 A1* | 4/2023 | Savage | H04L 9/0894 |
| | | | 713/156 |
| 2023/0325535 A1* | 10/2023 | Sharma | G06F 21/33 |
| | | | 726/17 |
| 2024/0078343 A1* | 3/2024 | Sibert | H04L 9/3234 |
| 2024/0265083 A1* | 8/2024 | Moran | G06F 21/44 |

* cited by examiner

SYSTEMS AND METHODS FOR VALIDATING THE AUTHENTICITY OF DEVICES USED IN INFORMATION HANDLING SYSTEMS

BACKGROUND

As the value and use of information continues to increase, individuals and businesses seek additional ways to process and store information. One option is an information handling system (IHS). An IHS generally processes, compiles, stores, and/or communicates information or data for business, personal, or other purposes. Because technology and information handling needs and requirements may vary between different applications, IHSs may also vary regarding what information is handled, how the information is handled, how much information is processed, stored, or communicated, and how quickly and efficiently the information may be processed, stored, or communicated. The variations in IHSs allow for IHSs to be general or configured for a specific user or specific use such as financial transaction processing, airline reservations, enterprise data storage, global communications, etc. In addition, IHSs may include a variety of hardware and software components that may be configured to process, store, and communicate information and may include one or more computer systems, data storage systems, and networking systems.

Security has become an important aspect the IHSs operation as bad actors continually develop new ways to illicitly intrude into IHSs. For each IHS architectural makeup, several potential points of attack may exist for a malicious party to steal data, modify data, and/or engage in other illicit activities. To mitigate the potential for such attacks, a variety of techniques may be employed to enhance the security of IHSs. For example, secure communication channels between the various components of an IHS may be established, such as those using Transport Layer Security (TLS) and/or Secure Sockets Layer (SSL) protocols. As another example, password and/or other credential-based authentication between the various components of an IHS may be used to establish trust. In yet another example, non-password secure communication techniques that do not necessarily require user input may be applied. In such cases, to enable non-password administrative addressing to an endpoint, an authentication technique, such as a Fast ID Online (FIDO) protocol may be used to further protect endpoint secrets with certain cryptographic methods. The FIDO Device Onboard (FDO) standard may use the FIDO protocol to automate an initial registration operation of a device using a Rendezvous server.

SUMMARY

According to embodiments of the present disclosure, systems and methods for validating the authenticity of devices used in information handling systems (IHSs) are provided. According to one embodiment, an IHS includes a replacement/repaired device to be configured in a computing system, and computer-executable instructions to receive a to-be-replaced public key of a to-be-replaced/repaired device configured in the computing system, sign, using a replacement/repaired device private key of the replacement/repaired device, attestation data associated with the replacement/repaired device, and sign, using a vendor private key of a vendor of the replacement/repaired device, the signed attestation data and a replacement/repaired device public key of the replacement/repaired device. The instructions may then encrypt, using the received to-be-replaced public key, the signed attestation data and the replacement/repaired device public key, and sign, using a vendor private key, the encrypted data to save into a new voucher that pairs the to-be-replaced/repaired device with the replacement/repaired device.

According to another embodiment, a device authenticity validation method includes the steps of receiving a to-be-replaced public key of a to-be-replaced/repaired device configured in a computing system, signing, using a replacement/repaired device private key of a replacement/repaired device, attestation data associated with the replacement/repaired device, and signing, using a vendor private key of a vendor of the replacement/repaired device, the signed attestation data and a replacement/repaired device public key of the replacement/repaired device. The method may then perform the steps of encrypting, using the received to-be-replaced public key, the signed attestation data and the replacement/repaired device public key, and signing, using a vendor private key, the encrypted data to save into a new voucher that pairs the to-be-replaced/repaired device with the replacement/repaired device.

According to yet another embodiment, a computer program product includes a computer readable storage medium with program instructions stored thereon that, upon execution by an IHS, cause that IHS to receive a to-be-replaced public key of a to-be-replaced/repaired device configured in a computing system, sign, using a replacement/repaired device private key of a replacement/repaired device, attestation data associated with the replacement/repaired device, and sign, using a vendor private key of a vendor of the replacement/repaired device, the signed attestation data and a replacement/repaired device public key of the replacement/repaired device. The instructions may then cause the HIS to encrypt, using the received to-be-replaced public key, the signed attestation data and the replacement/repaired device public key, and sign, using a vendor private key, the encrypted data to save into a new voucher that pairs the to-be-replaced/repaired device with the replacement/repaired device.

BRIEF DESCRIPTION OF THE DRAWINGS

The present invention(s) is/are illustrated by way of example and is/are not limited by the accompanying figures, in which like references indicate similar elements. Elements in the figures are illustrated for simplicity and clarity, and have not necessarily been drawn to scale.

FIG. 6 illustrates an example immutable device configuration recordation method that may be used to record a

DETAILED DESCRIPTION

Figure 1:
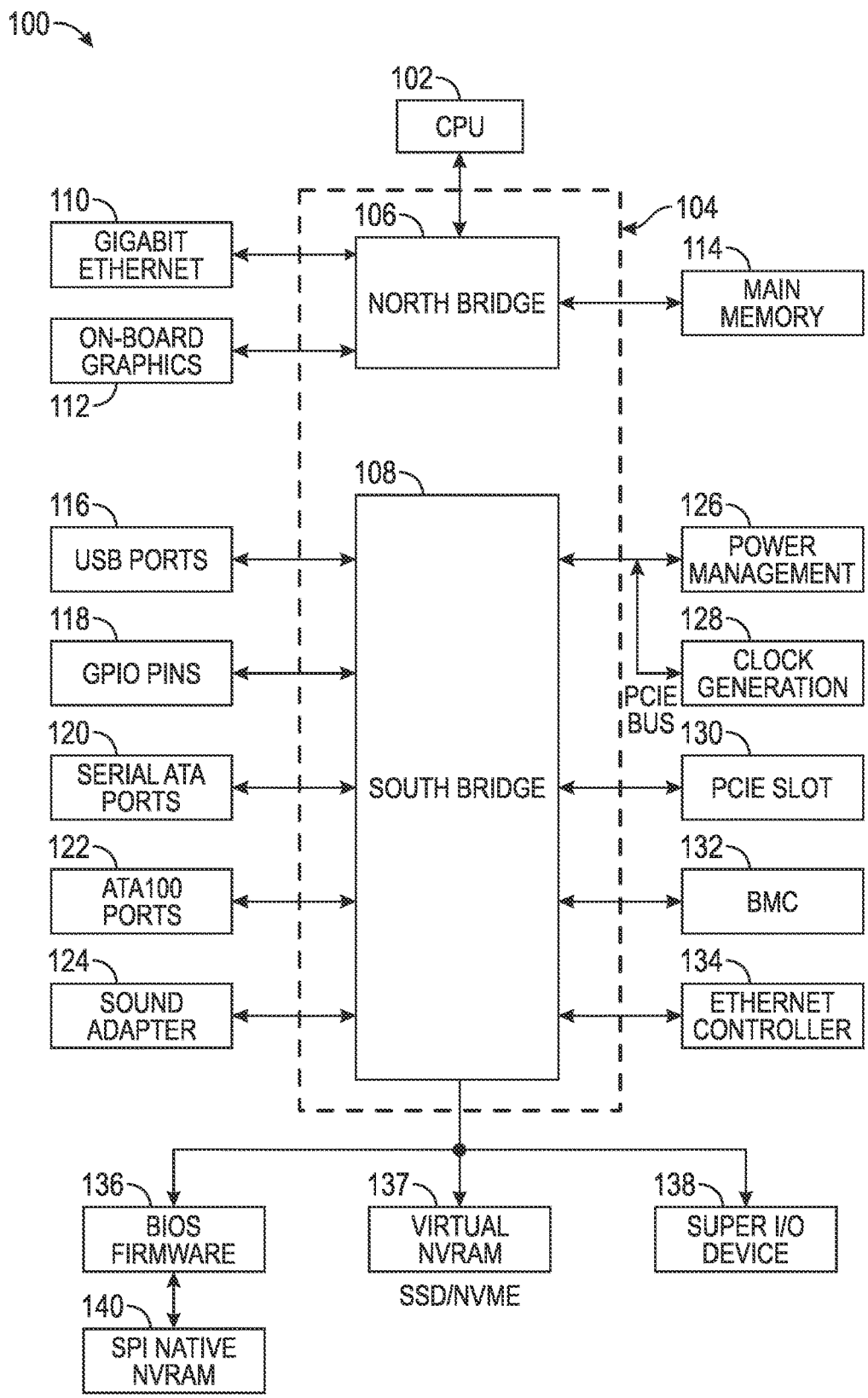
FIG. 1 shows an example of an IHS that may be configured to implement embodiments described herein.

The present disclosure is described with reference to the attached figures. The figures are not drawn to scale, and they are provided merely to illustrate the disclosure. Several aspects of the disclosure are described below with reference to example applications for illustration. It should be understood that numerous specific details, relationships, and methods are set forth to provide an understanding of the disclosure. The present disclosure is not limited by the illustrated ordering of acts or events, as some acts may occur in different orders and/or concurrently with other acts or events. Furthermore, not all illustrated acts or events are required to implement a methodology in accordance with the present disclosure.

For purposes of this disclosure, an Information Handling System (IHS) may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an IHS may be a personal computer (e.g., desktop or laptop), tablet computer, mobile device (e.g., Personal Digital Assistant (PDA) or smart phone), server (e.g., blade server or rack server), a network storage device, or any other suitable device and may vary in size, shape, performance, functionality, and price. An IHS may include Random Access Memory (RAM), one or more processing resources such as a Central Processing Unit (CPU) or hardware or software control logic, Read-Only Memory (ROM), and/or other types of nonvolatile memory. Additional components of an IHS may include one or more disk drives, one or more network ports for communicating with external devices as well as various I/O devices, such as a keyboard, a mouse, touchscreen, and/or a video display. An IHS may also include one or more buses operable to transmit communications between the various hardware components. An example of an IHS is described in more detail below.

Cyber attackers are reportedly exploiting and abusing devices, such as platform interface protocol analyzers to steal unencrypted information, spy on network traffic, and gather information to leverage in future attacks against platform components and component interfaces (e.g., I2C, PCIe, I3C, Sensewire, SPI, etc.) of IHSs. Detection of vulnerable platform components is not an easy task, and exploiting unpatched vulnerabilities could allow the attacker to take control of an IHS. Some example platform security risks may include compromised security in which hostile component insertion and/or compromised firmware updates can cause supply chain security issues. Another example platform security risk may include confidentiality and integrity risks in which data transfers that are unencrypted may be vulnerable to eavesdropping, stealing, and tampering. Additionally, non-compliant security configuration errors, certificate management, platform security trust, and the like could lead to non-compliance with industry standard security policies. The FIDO Device Onboard (FDO) standard has been developed to alleviate such problems and reduce management overhead in maintaining and establishing the platform security involving non-password secure communication techniques within the IHS infrastructure domain.

A typical server may be configured with numerous devices, such as I/O cards, on-board graphics adapter cards, Ethernet adapters, sound adapters, power management circuitry, and the like may be replaced or added to from time to time due to a desire to upgrade the IHS's performance and/or due to a failure of an existing device. Such devices are often configured with executable firmware that can be updated with new firmware on an as needed basis. This feature, however, could potentially cause security issues due to malware that can be illicitly installed on those devices. One particular security susceptibility may involve the supply chain used between a vendor of the device and the end user who configures the device in their server. That is, an illicit actor may, during shipping of the device from vendor to end user, install malware on the device such that when installed on the server, causes one or more security breaches in that server. According to embodiments of the present disclosure, systems and methods for validating the authenticity of devices used in information handling systems (IHSs) are provided that ensures the firmware and other attestation data created by the vendor is validated for use by an IHS of an end user as will be described in detail herein below.

FIG. 1 shows an example of an IHS 100 that may be configured to implement embodiments described herein. It should be appreciated that although certain embodiments described herein may be discussed in the context of a desktop or server computer, other embodiments may be utilized with virtually any type of IHS 100. Particularly, the IHS 100 includes a baseboard or motherboard, to which is a printed circuit board (PCB) to which components or devices are mounted by way of a bus or other electrical communication path. For example, Central Processing Unit (CPU) 102 operates in conjunction with a chipset 104. CPU 102 is a processor that performs arithmetic and logic necessary for the operation of the IHS 100.

Chipset 104 includes northbridge 106 and southbridge 108. Northbridge 106 provides an interface between CPU 102 and the remainder of the IHS 100. Northbridge 106 also provides an interface to a random access memory (RAM) used as main memory 114 in the IHS 100 and, possibly, to on-board graphics adapter 112. Northbridge 106 may also be configured to provide networking operations through Ethernet adapter 110. Ethernet adapter 110 is capable of connecting the IHS 100 to another IHS 100 (e.g., a remotely located IHS 100) via a network. Connections which may be made by Ethernet adapter 110 may include local area network (LAN) or wide area network (WAN) connections. Northbridge 106 is also coupled to southbridge 108.

Southbridge 108 is responsible for controlling many of the input/output (I/O) operations of the IHS 100. In particular, southbridge 108 may provide one or more universal serial bus (USB) ports 116, sound adapter 124, Ethernet controller 134, and one or more general purpose input/output (GPIO) pins 118. Southbridge 108 may also provide a bus for interfacing peripheral card devices such as PCIe slot 130. In some embodiments, the bus may include a peripheral component interconnect (PCI) bus. Southbridge 108 may also provide baseboard management controller (BMC) 132 for use in managing the various components of the IHS 100. Power management circuitry 126 and clock generation circuitry 128 may also be utilized during operation of southbridge 108.

Additionally, southbridge 108 is configured to provide one or more interfaces for connecting mass storage devices to the IHS 100. For instance, in one embodiment, southbridge 108 may include a serial advanced technology attachment (SATA) adapter for providing one or more serial ATA ports 120 and/or an ATA100 adapter for providing one or more ATA100 ports 122. Serial ATA ports 120 and ATA100 ports 122 may be, in turn, connected to one or more mass storage devices storing an operating system (OS) and application programs.

An OS may comprise a set of programs that controls operations of the IHS 100 and allocation of resources. An application program is software that runs on top of the OS and uses computer resources made available through the OS to perform application-specific tasks desired by the user.

Mass storage devices connected to southbridge 108 and PCIe slot 130, and their associated computer-readable media provide non-volatile storage for the IHS 100. Although the description of computer-readable media contained herein refers to a mass storage device, such as a hard disk or CD-ROM drive, it should be appreciated by a person of ordinary skill in the art that computer-readable media can be any available media on any memory storage device that can be accessed by the IHS 100. Examples of memory storage devices include, but are not limited to, RAM, ROM, EPROM, EEPROM, flash memory or other solid state memory technology, CD-ROM, DVD, or other optical storage, magnetic cassettes, magnetic tape, magnetic disk storage or other magnetic storage devices.

A low pin count (LPC) interface may also be provided by southbridge 108 for connecting Super I/O device 138. Super I/O device 138 is responsible for providing a number of I/O ports, including a keyboard port, a mouse port, a serial interface, a parallel port, and other types of input/output ports.

The LPC interface may connect a computer storage media such as a ROM or a flash memory such as a non-volatile random access memory (NVRAM) for storing BIOS/firmware 136 that includes BIOS program code containing the basic routines that help to start up the IHS 100 and to transfer information between elements within the IHS 100. BIOS/firmware 136 comprises firmware compatible with the Extensible Firmware Interface (EFI) Specification and Framework.

The LPC interface may also be utilized to connect virtual NVRAM 137 (e.g., SSD/NVMe) to the IHS 100. The virtual NVRAM 137 may be utilized by BIOS/firmware 136 to store configuration data for the IHS 100. In other embodiments, configuration data for the IHS 100 may be stored on the same virtual NVRAM 137 as BIOS/firmware 136. The IHS 100 may also include a SPI native NVRAM 140 coupled to the BIOS 136.

BMC 132 may include non-volatile memory having program instructions stored thereon that enable remote management of the IHS 100. For example, BMC 132 may enable a user to discover, configure, and manage the IHS 100, setup configuration options, resolve and administer hardware or software problems, etc. Additionally or alternatively, BMC 132 may include one or more firmware volumes, each volume having one or more firmware files used by the BIOS' firmware interface to initialize and test components of the IHS 100.

As a non-limiting example of BMC 132, the integrated DELL Remote Access Controller (IDRAC) from DELL, INC. is embedded within DELL POWEREDGE servers and provides functionality that helps information technology (IT) administrators deploy, update, monitor, and maintain servers with no need for any additional software to be installed. The iDRAC works regardless of OS or hypervisor presence from a pre-OS or bare-metal state because iDRAC is embedded within the IHS 100 from the factory.

It should be appreciated that, in other embodiments, the IHS 100 may comprise other types of computing devices, including hand-held computers, embedded computer systems, personal digital assistants, and other types of computing devices. It is also contemplated that the IHS 100 may not include all of the components shown in FIG. 1, may include other components that are not explicitly shown in FIG. 1, or may utilize a different architecture.

Figure 2:
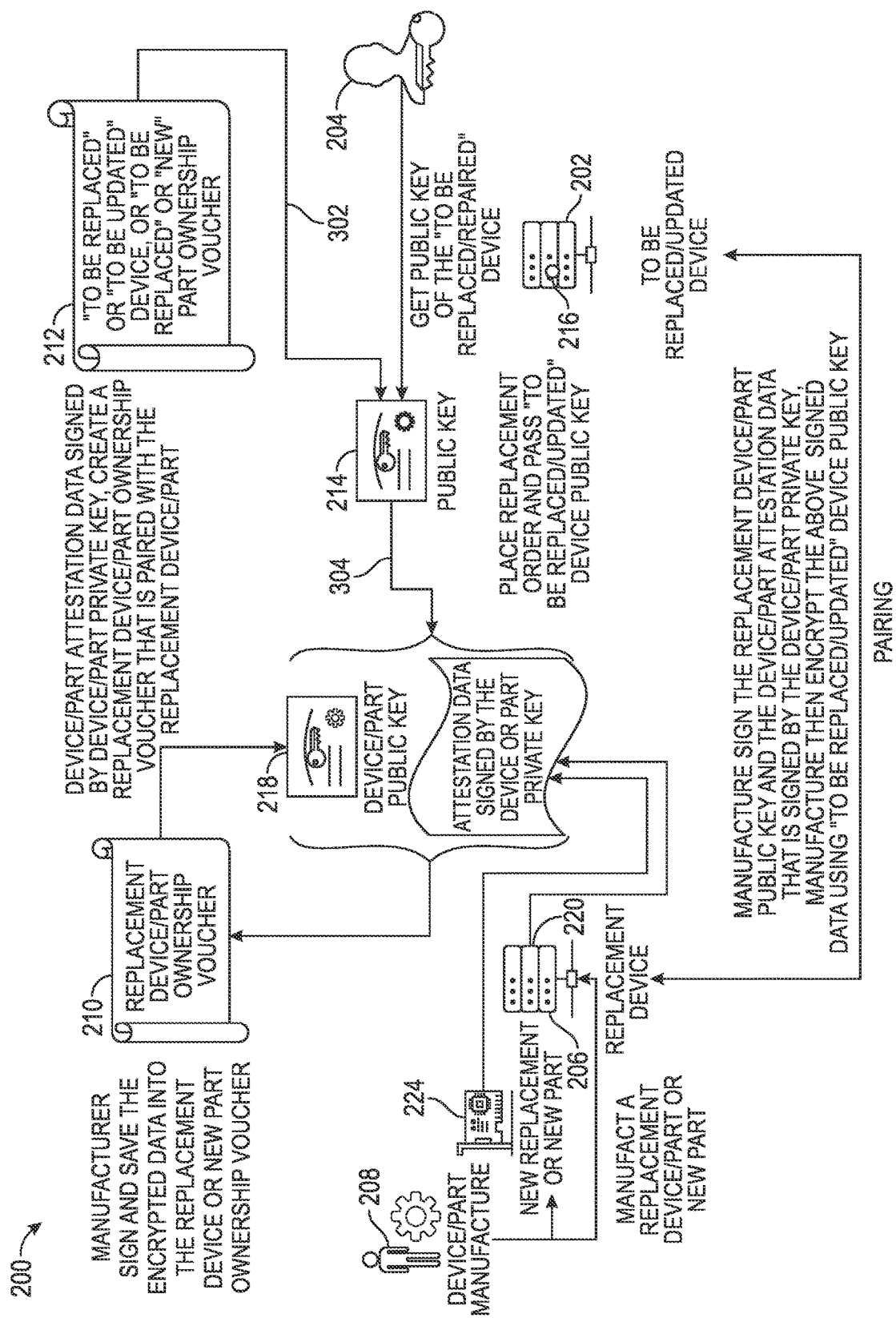
FIG. 2 illustrates an example device authenticity validation system that may be used to validate the authenticity of a device that has been received from a vendor of the device according to one embodiment of the present disclosure.

FIG. 2 illustrates an example device authenticity validation system 200 that may be used to validate the authenticity of a device that has been received from a vendor of the device according to one embodiment of the present disclosure. The device authenticity validation system 200 generally involves a to-be-replaced/repaired device 202 and a replacement/repaired device 206. The to-be-replaced/repaired device 202 may be one, for example, which is configured in an IHS 100 as shown above, and is desired to-be-replaced by the replacement/repaired device 206 for an end user 204. The replacement/repaired device 206 may be one provided (e.g., manufactured, assembled, created, etc.) by a vendor 208 and shipped to the end user 204 for configuring in the IHS 100. The replacement/repaired device 206 may be, for example, an upgraded version of the to-be-replaced/repaired device 202 having improved performance, while in other cases, the replacement/repaired device 206 may be similar to the to-be-replaced/repaired device 202 in which the to-be-replaced/repaired device 202 is to-be-replaced with the replacement/repaired device 206 because the to-be-replaced/repaired device 202 has failed. The to-be-replaced/repaired device 202 and replacement/repaired device 206 may be any type, such as on-board graphics adapter 112, Ethernet adapter 110, USB ports 116, sound adapter 124, Ethernet controller 134, GPIO pins 118, PCIe slot 130, Power management circuitry 126, clock generation circuitry 128, serial ATA ports 120, ATA100 ports 122, virtual NVRAM 137, SPI native NVRAM 140, and Super I/O device 138 as described herein above.

According to one embodiment, the replacement/repaired device 206 may be a repaired or updated device that replaces the to-be-replaced/repaired device 202. For example, the replacement/repaired device 206 may itself include a part, such as a GPU, that possesses its own firmware. Thus, the firmware on that part should also be validated to ensure its authenticity. For example, the to-be-repaired device may be an updated version of its repaired device counterpart, such as a device with additional components or parts with their own firmware.

The device authenticity validation system 200 may involve a series of actions or steps that may be taken to generate a replacement part voucher 210 that is shipped to the end user 204 on or about the same time that the replacement/repaired device 206 is shipped to the end user 204. The replacement part voucher 210 may be used to validate various aspects of the replacement/repaired device 206, which may include a checksum of firmware installed on the to-be-replaced/repaired device 202, any other software, and/or selected configuration files or settings that may be referred to as attestation data. Initially, a new part voucher 212 may be generated, for example, in response to a contractual agreement (e.g., financial transaction) between the end user 204 and vendor 208 for providing the replacement/repaired device 206 from the vendor 208 to the end user 204. The to-be-replaced/repaired device 202 is configured with a public key 214 and a private key 216 while the replacement/repaired device 206 is configured with a public key 218 and a private key 220 for reasons that will be described herein below.

It is contemplated that the system 200 may be used to validate the authenticity of a new device 224 without necessarily removing or replacing an existing device on the IHS 100. One particular embodiment describing how the system 200 may be used to validate the authenticity of a new device 224 without removing an existing device will be described below with reference to FIG. 5.

Figure 3:
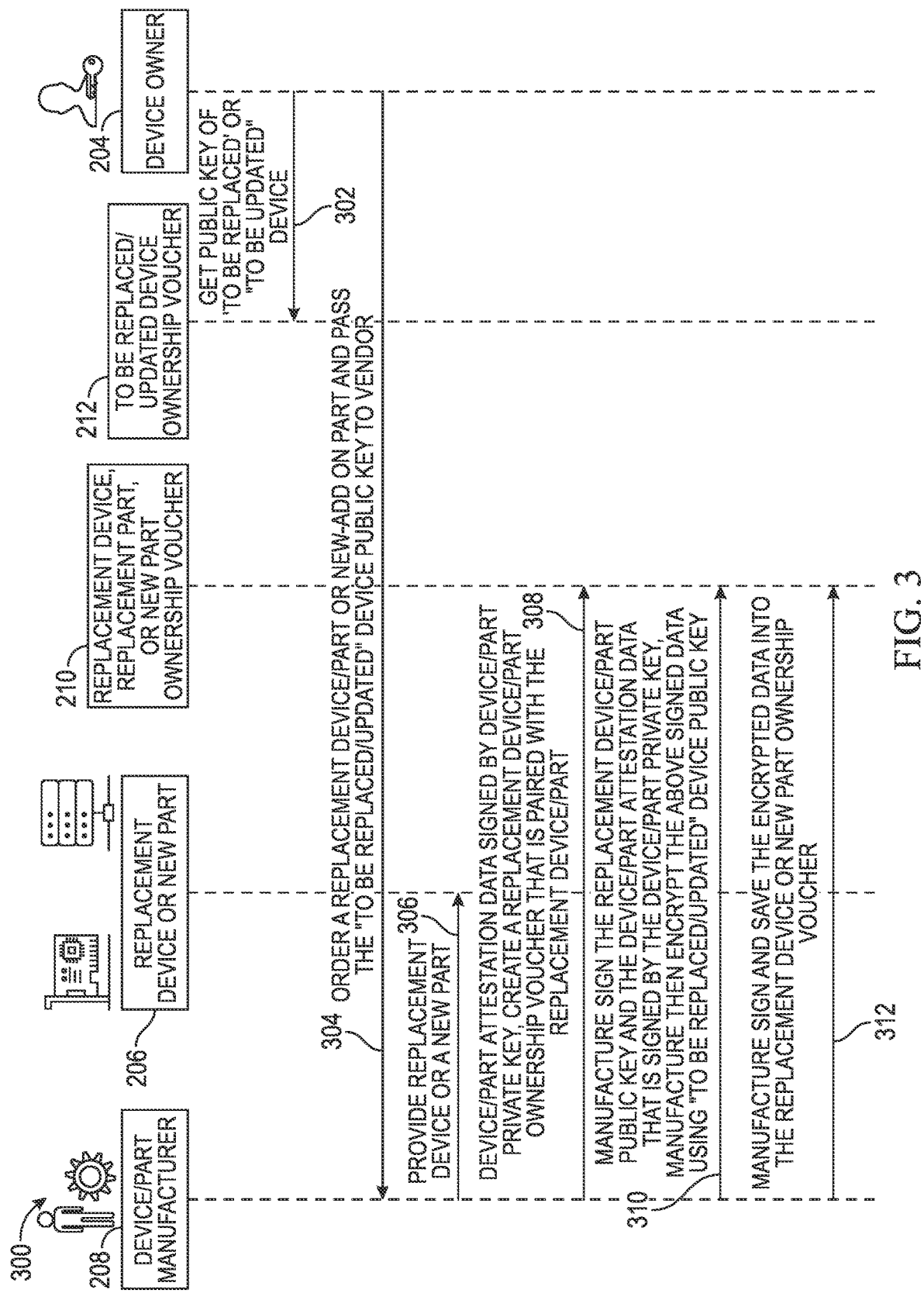
FIG. 3 illustrates an example device pairing method according to one embodiment of the present disclosure.
Figure 4:
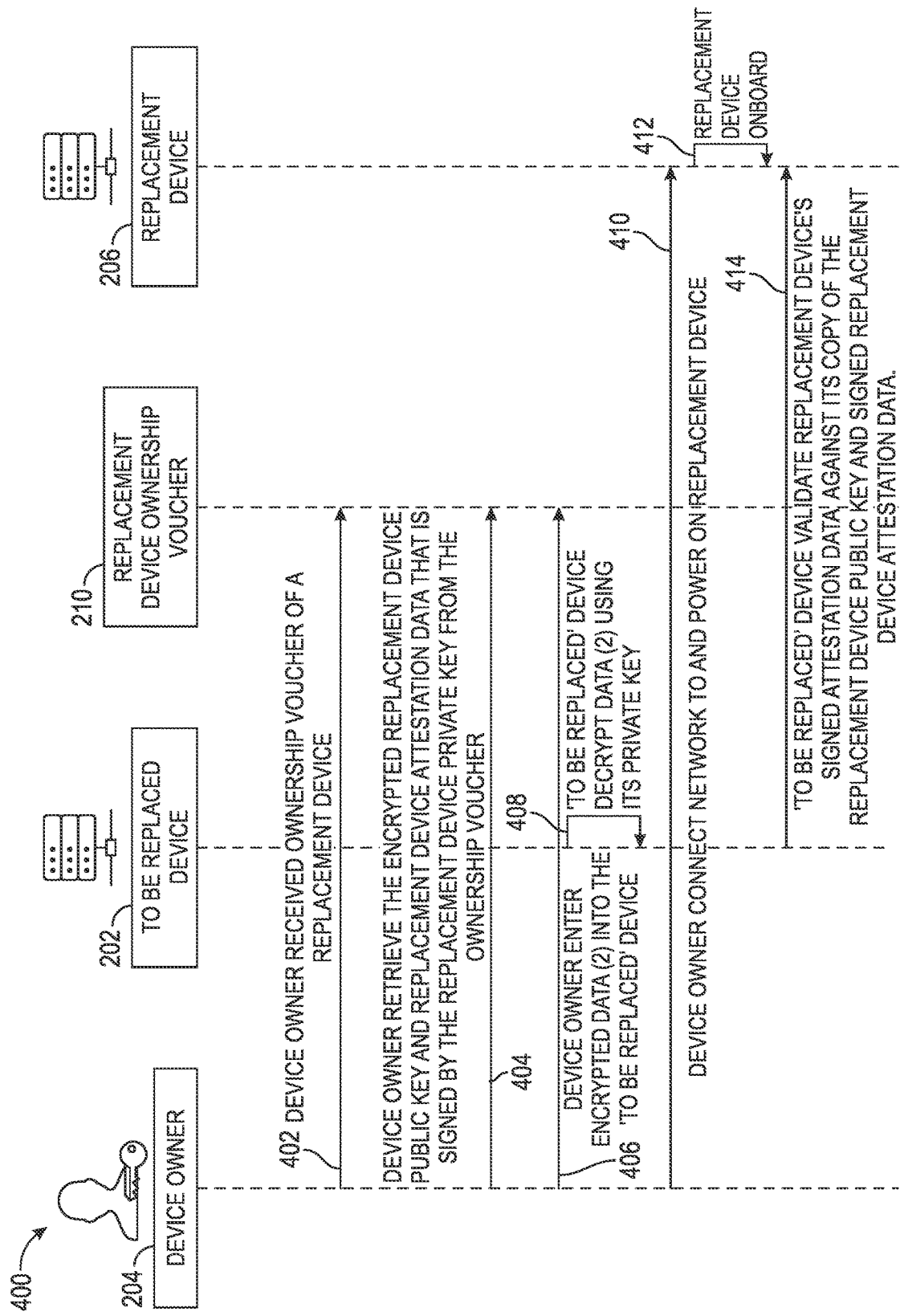
FIG. 4 illustrates an example device validation method that may be used to validate a replacement of a to-be-replaced/repaired device with a replacement/repaired device according to one embodiment of the present disclosure.

FIG. 3 illustrates an example device pairing method 300, while FIG. 4 illustrates an example device validation method 400 according to one embodiment of the present disclosure. Additionally or alternatively, either of the methods 300, 400 may be performed by the device authenticity validation system 200 as described above with reference to FIG. 2. In a particular example, the device pairing method 300 may be performed at a vendor site where the replacement/repaired device 206 is created or assembled, while the device validation method 400 may be performed where the target IHS 100 to receive the replacement/repaired device 206 is located.

The methods 300, 400 may be performed, for example, with each device 202 that is configured in an IHS 100, such as after the IHS 100 has been deployed for use by the end user 204, and the end user 204 desires to add or replace a device in the IHS 100. It is also contemplated that the methods 300, 400 may be performed when the IHS 100 is initially deployed during an assembly process managed by a vendor of the IHS 100 to add or replace devices in the IHS 100. The steps shown in FIG. 3 are also graphically shown on FIG. 2 for clarity of description.

Initially at step 302, the device pairing method 300 obtains the public key 214 of the to-be-replaced/repaired device 202, and at step 304, a new part voucher 212 is generated, the public key of the to-be-replaced/repaired device 202 is stored in the new part voucher 212, and the voucher 212 sent to the vendor 208. For example, the new part voucher 212 may be generated by an online service provided by the vendor 208 for each end user 204 who purchases or otherwise obtains a right to receive the device 206 from the vendor 208, such as in response to a financial transaction performed for the right to obtain the replacement/repaired device 206.

At step 306, the replacement/repaired device 206 is provided by the vendor 208. Thereafter at step 308 of the device pairing method 300, the attestation data of the replacement/repaired device 206 is signed by the private key 220 of the replacement/repaired device 206, and the signed attestation data is stored in a newly created replacement part voucher 210. The attestation data may include, for example, firmware, executable software, and/or one or more configuration files installed or otherwise stored on the replacement/repaired device 206.

At step 310, the device pairing method 300 signs, using a public key of the vendor 208, the attestation data and the public key 218 of the replacement/repaired device 206, and encrypts the attestation data using the public key 218 of the replacement/repaired device 206. Because both the attestation data and the public key 214 of the to-be-replaced/repaired device 202 are signed by the public key of the vendor 208, the authenticity of the attestation data and public key 218 can be maintained with a relatively high degree of certainty by anyone who possesses the public key of the vendor 208. Additionally, because the attestation data and the public key 218 are encrypted using the public key 214 of the to-be-replaced/repaired device 202, the replacement/repaired device 206 can now be considered to be paired with the to-be-replaced/repaired device 202 in that only the private key 216 of the to-be-replaced/repaired device 202 can be used to decrypt the attestation data so that the replacement/repaired device 206 can be used. Thereafter at step 312, the device pairing method 300 stores the encrypted attestation data and public key 218 in the replacement part voucher 210. After the method 300 performs step 312, the method 300 ends. Additional details associated with how the to-be-replaced/repaired device 202 may be replaced by the replacement/repaired device 206 will be described with reference to FIG. 4 described herein below.

FIG. 4 illustrates an example device validation method 400 that may be used to validate a replacement of a to-be-replaced/repaired device 202 with a replacement/repaired device 206 according to one embodiment of the present disclosure. Additionally or alternatively, the device validation method 400 may be performed by certain components of the device authenticity validation system 200 as described above with reference to FIG. 2. The device validation method 400 may be performed, for example, when the device 206 has been physically delivered to the end user 204, or when the IHS 100 is initially deployed during an assembly process managed by a vendor of the IHS 100.

At step 402, the end user 204 takes possession of the replacement/repaired device 206 and the replacement part voucher 210. Thereafter at step 404, the end user 204 obtains the encrypted public key 218 and attestation data from the replacement/repaired device 206 to create the voucher 210, and enters the voucher 210 in the to-be-replaced/repaired device 202 at step 406. While the present embodiment describes the end user 204 as copying the encrypted data from the replacement part voucher 210 to the replacement/repaired device 206; in other embodiments, it is contemplated that the encrypted data may be copied to the to-be-replaced/repaired device 202 in any suitable manner, such as by executable instructions performed by the device authenticity validation system 200.

At step 408, the to-be-replaced/repaired device 202 decrypts the encrypted public key 218 and attestation data using its private key 216. The to-be-replaced/repaired device 202 is the only entity that can perform this because only it possesses the private key 216 associated with the public key 214 that was used to encrypt the public key 218 and attestation data. The end user 204 then installs the replacement/repaired device 206 in the IHS 100 and powers it on at step 410. At step 412, the replacement/repaired device 206 is on-boarded onto the IHS 100. For example, the replacement/repaired device 206 may be booted to perform certain initialization procedures as is common to devices when they are powered on in an IHS 100 for the first time. Once initially on-boarded, the IHS 100 may inhibit normal operations from being performed by the replacement/repaired device 206 pending validation of its attestation data.

At step 414, the to-be-replaced/repaired device 202 validates the attestation data stored in the replacement/repaired device 206 using its version of the decrypted public key 214 and attestation data. If the public key 214 and attestation data have been validated, the method 400 may allow the replacement/repaired device 206 to be used in the IHS 100 in a normal manner. If, however, the public key 214 and attestation data have been determined to be invalid, the method 400 may continue to inhibit normal operation of the replacement/repaired device 206 and generate an alert message to the end user 204. Nevertheless, after performing step 414, the to-be-replaced/repaired device 202 may be removed from the IHS 100. Thereafter, the method 400 ends.

Figure 5:
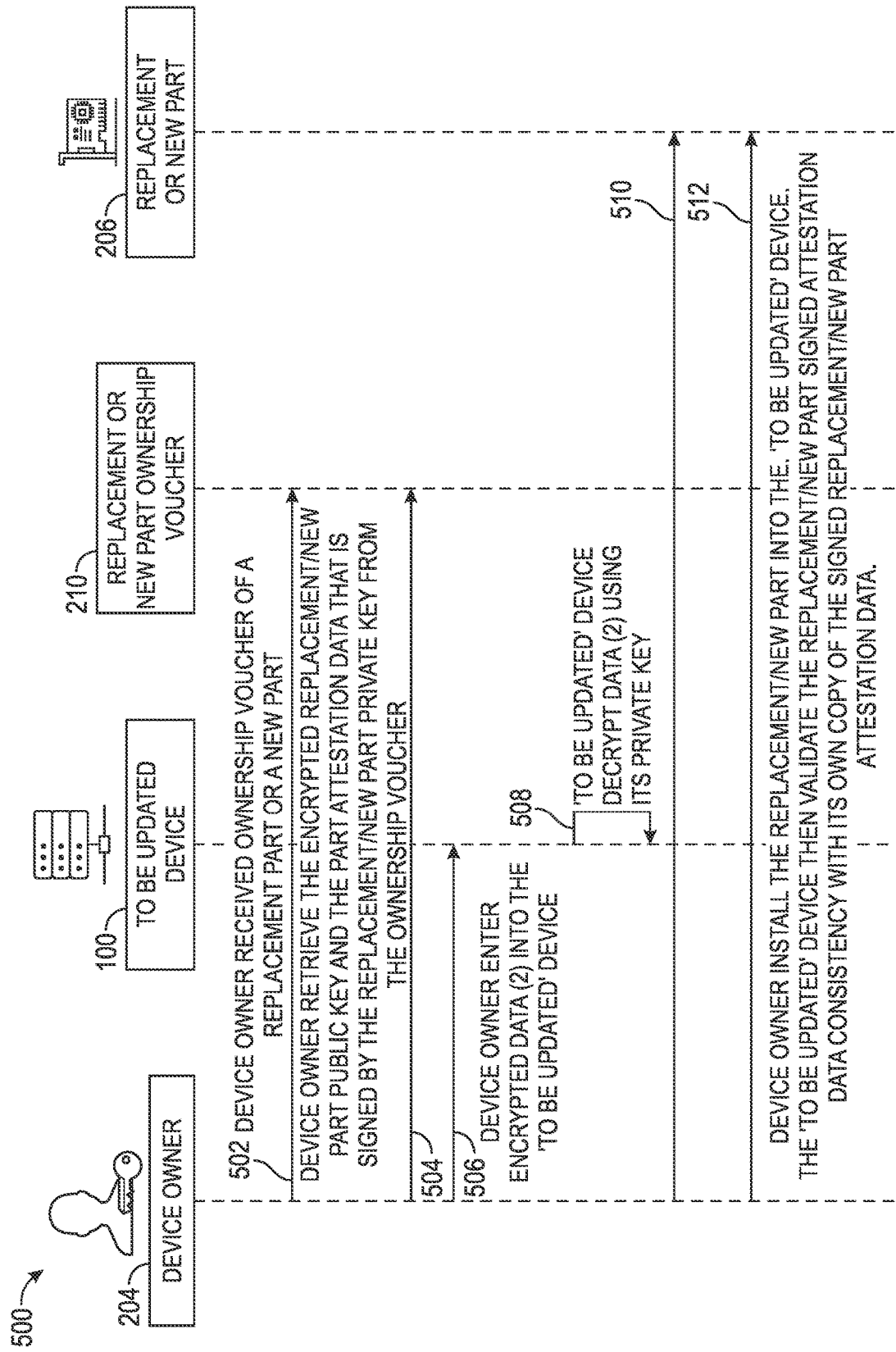
FIG. 5 illustrates another example device validation method that may be used to validate a device according to one embodiment of the present disclosure.

FIG. 5 illustrates another example device validation method 400 that may be used to validate a device according to one embodiment of the present disclosure. Whereas the device validation method 400 of FIG. 4 could be used to validate a device that replaces another to-be-replaced/repaired device 202, the embodiment of FIG. 5 may be used to validate an added device 224 when it is not replacing any device on the IHS 100. Additionally or alternatively, the device validation method 500 may be performed by certain components of the device authenticity validation system 200 as described above with reference to FIG. 2. The device validation method 500 may be performed, for example, when the device 224 has been physically delivered to the end user 204, or when the IHS 100 is initially deployed during an assembly process managed by a vendor of the IHS 100.

Initially at step 502, the end user 204 takes possession of the added device 224 and the replacement part voucher 210, and at step 504, the end user 204 obtains the encrypted public key 218 and attestation data from the added device 224. Thereafter at step 506, the end user 204 stores the encrypted public key 218 and attestation data from the added device 224 in the IHS 100. That is, while FIG. 4 describes an embodiment in which the to-be-replaced/repaired device 202 decrypts the encrypted public key 218 and attestation data from the added device 224 using the to-be-replaced/repaired device 202, the present embodiment decrypts the encrypted public key 218 and attestation data from the added device 224 using the IHS 100 in which the added device 224 is to be deployed. While the present embodiment describes the end user 204 as copying the encrypted data from the replacement part voucher 210 to the added device 224, and entering the attestation data into the IHS 100 manually; in other embodiments, it is contemplated that the encrypted data may be copied to the to-be-replaced/repaired device 202 in any suitable manner, such as by executable instructions performed by the device authenticity validation system 200.

At step 508, the IHS 100 decrypts the encrypted public key 218 and attestation data using its private key. The IHS 100 is the only entity that can perform this because only it possesses the private key associated with the public key that was used to encrypt the public key 218 and attestation data. In other embodiments, any suitable device may be used to decrypt encrypted public key 218 and attestation data from the added device 224 in which the end user 204 has sufficient trust. For example, the encrypted public key 218 and attestation data from the added device 224 may be decrypted by a cell phone (not shown) of the end user 204 in which a public key of the cell phone was previously provided to the vendor 208 via the voucher 212, such as at steps 302 and 304.

The end user 204 then installs the added device 224 in the IHS 100 and powers it on at step 510. Once powered on, the added device 224 may be on-boarded onto the IHS 100 in a normal manner. For example, the added device 224 may be booted to perform certain initialization procedures as is common to devices when they are powered on in an IHS 100 for the first time. Once initially on-boarded, the IHS 100 may inhibit normal operations from being performed by the added device 224 pending validation of its attestation data.

At step 512, the to-be-replaced/repaired device 202 validates the attestation data stored in the added device 224 using its version of the decrypted public key and attestation data. If the public key and attestation data have been validated, the method 500 may allow the added device 224 to be used in the IHS 100 in a normal manner. If, however, the public key and attestation data have been determined to be invalid, the method 500 may continue to inhibit normal operation of the added device 224 and generate an alert message to the end user 204. Thereafter, the method 500 ends.

Although FIGS. 3-5 describe example methods 300, 400, and 500 that may be performed to securely add and/or replace a device in an IHS 100, the features of the methods 300, 400, and 500 may be embodied in other specific forms without deviating from the spirit and scope of the present disclosure. For example, either of the methods 300, 400, and 500 may perform additional, fewer, or different operations than those described in the present examples. For another example, either of the methods 300, 400, and 500 may be performed in a sequence of steps different from that described above. As yet another example, certain steps of either of the methods 300, 400, and 500 may be performed by other components in the IHS 100 other than those described above.

Figure 6:
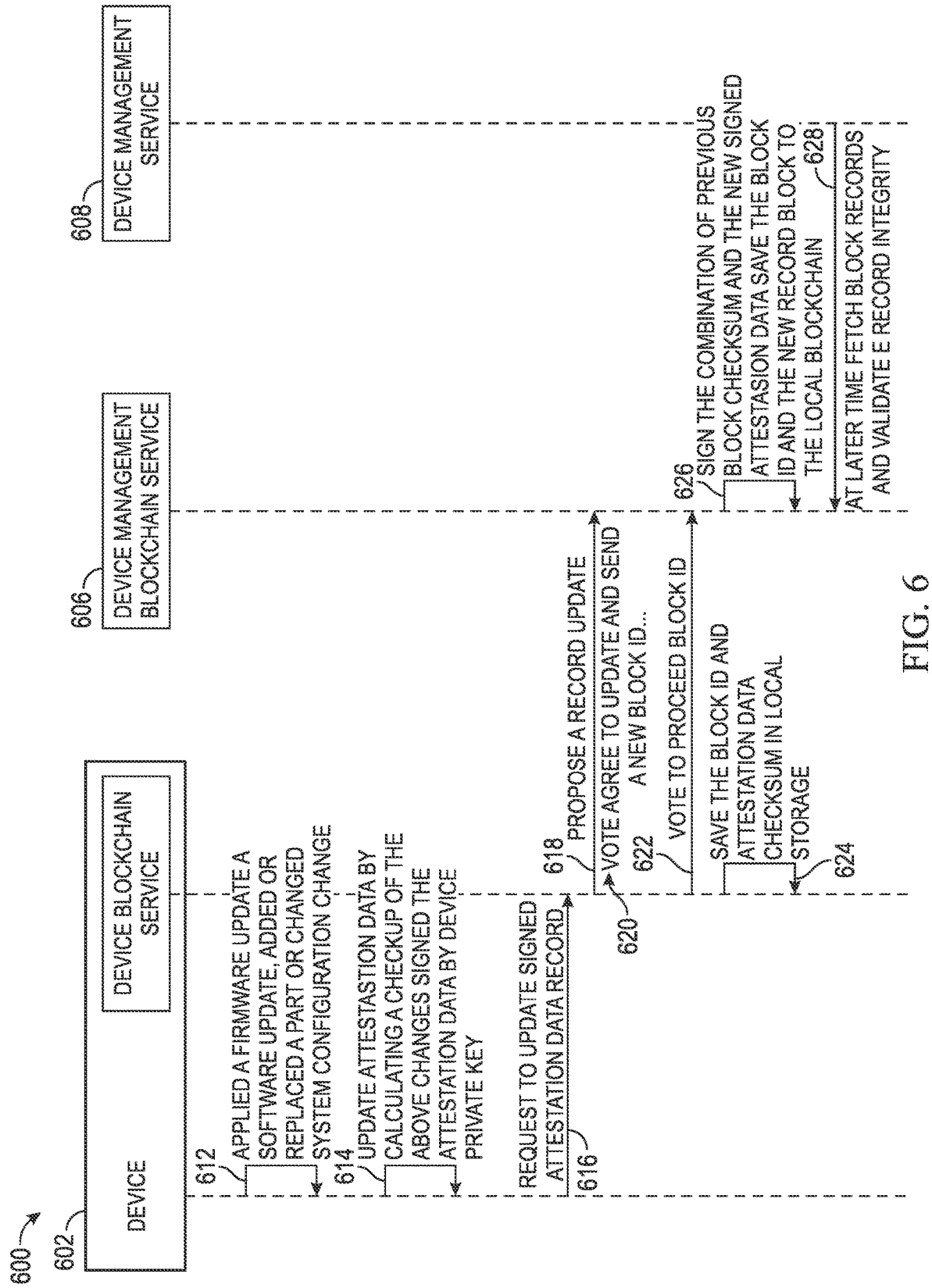

FIG. 6 illustrates an example immutable device configuration recordation method 600 that may be used to record a history of configuration changes to a device 602 according to one embodiment of the present disclosure. The device 602 may be similar in type and composition to the device 206 described above with reference to FIG. 2. Additionally, while only one device 602 is shown, it should be appreciated that the immutable device configuration recordation method 600 may be performed with any number of devices, such as some, most, or all of the devices 602 configured in the IHS 100. The immutable device configuration recordation method 600 may be performed any time that the device 602 undergoes a configuration change, such as following a firmware update or even after a configuration change is made to the device 602.

The immutable device configuration recordation method 600 may be performed using a device blockchain service 604 executed from within the device 602, a device management blockchain service 606, and a device management service 608. In one embodiment, the device management blockchain service 606 may include a set of executable instructions stored and executed on a BMC 132, which is configured in an IHS 100, while the device management service 608 may include a set of executable instructions that are stored on, and executed by a console, such as one that manages the operation of the IHS 100. For example, the console may include a systems management appliance such as the Dell EMC OpenManage Enterprise (OME) systems manager that is installed on a secure virtual machine (VM), such as a VMWARE Workstation. Additionally, the console may be configured locally to the IHS 100 (e.g., in the same data center), or remotely over communication network, such as the Internet.

Initially at step 612, a configuration change is made to the device 602. Examples of such a configuration change may include a firmware update that is performed on the device 602, and/or a change to one or more settings on the device 602. In one embodiment, the immutable device configuration recordation method 600 may include logic that determines certain types of settings that when changed, may trigger a new record to be generated. For example, certain settings that when changed, could critically affect the operation of the device 602 and/or IHS 100 in which it is configured, may cause the logic to trigger a new recordation of the setting change, while other settings that are not as critical would not trigger a new recordation of its setting change.

At step 614, the immutable device configuration recordation method 600 updates attestation data associated with the device 602 by calculating a checksum of the changes, and signing the attestation data using the private key associated with the device 602. The immutable device configuration recordation method 600 then sends a request to update the signed attestation data record to the device blockchain service 604 at step 616, which in turn, forwards the request to the device management blockchain service 606 at step 618.

At step 620, the device blockchain service 604 and device management blockchain service 606 vote whether a new block should be added to the blockchain. Device configuration changes are recorded in a blockchain to ensure only approved changes are recorded. In one embodiment, the Device Management Blockchain Service 600 includes multiple nodes who are each voting members and each keeps a replica of the blockchain records. The devices 602 are clients to the Device Management Blockchain Service 600.

The voting mechanism may be controlled by one or more rules established within the device management blockchain service 600. When a configuration, software, and/or firmware change is to be made to a device 602, the device 602 sends a request to the Device Management Blockchain Service 600, which checks within the management service to verify the upgrade is within the acceptable established parameters. The vote signifies an approval and ensures the continued security of the device 602. At this stage, the device management blockchain service 602 can vote to not proceed with the upgrade, in which case the controller of the device management blockchain service is notified of a potential error or bad actor.

If the decision to add a new block is made at step 622, the device blockchain service 604 at step 624 saves the block ID and attestation data checksum in the storage of the device 602, while the device management blockchain service 606 signs the combination of the previous checksum and the new signed attestation data, and saves the block ID and the new record block to the local blockchain at step 626. In this manner, the record of the configuration change is considered to be immutable because it is tied to the blockchain and signed by the private key of the device management blockchain service 606. Additionally, the device blockchain service 604 may save only a checksum of the attestation data due to the limited storage capabilities of the device 602. Thereafter at step 628, any suitable device, such as the device management service 608 may query the device management blockchain service 606 for the attestation data stored in the immutable blockchain.

The process may be repeated for any configuration change that the device 602 undergoes to maintain an ongoing record of configuration changes to the device 602. Nevertheless, when use of the immutable device configuration recordation method 600 is no longer needed or desired, the immutable device configuration recordation method 600 ends.

Although FIG. 6 describes an example method 600 that may be performed to create and maintain an immutable record of configuration changes to a device, the features of the method 600 may be embodied in other specific forms without deviating from the spirit and scope of the present disclosure. For example, the method 600 may perform additional, fewer, or different operations than those described in the present examples. For another example, the method 600 may be performed in a sequence of steps different from that described above. As yet another example, certain steps of the method 600 may be performed by other components in the IHS 100 other than those described above.

It should be understood that various operations described herein may be implemented in software executed by processing circuitry, hardware, or a combination thereof. The order in which each operation of a given method is performed may be changed, and various operations may be added, reordered, combined, omitted, modified, etc. It is intended that the invention(s) described herein embrace all such modifications and changes and, accordingly, the above description should be regarded in an illustrative rather than a restrictive sense.

The terms "tangible" and "non-transitory," when used herein, are intended to describe a computer-readable storage medium (or "memory") excluding propagating electromagnetic signals; but are not intended to otherwise limit the type of physical computer-readable storage device that is encompassed by the phrase computer-readable medium or memory. For instance, the terms "non-transitory computer readable medium" or "tangible memory" are intended to encompass types of storage devices that do not necessarily store information permanently, including, for example, RAM. Program instructions and data stored on a tangible computer-accessible storage medium in non-transitory form may afterwards be transmitted by transmission media or signals such as electrical, electromagnetic, or digital signals, which may be conveyed via a communication medium such as a network and/or a wireless link.

Although the invention(s) is/are described herein with reference to specific embodiments, various modifications and changes can be made without departing from the scope of the present invention(s), as set forth in the claims below. Accordingly, the specification and figures are to be regarded in an illustrative rather than a restrictive sense, and all such modifications are intended to be included within the scope of the present invention(s). Any benefits, advantages, or solutions to problems that are described herein with regard to specific embodiments are not intended to be construed as a critical, required, or essential feature or element of any or all the claims.

Unless stated otherwise, terms such as "first" and "second" are used to arbitrarily distinguish between the elements such terms describe. Thus, these terms are not necessarily intended to indicate temporal or other prioritization of such elements. The terms "coupled" or "operably coupled" are defined as connected, although not necessarily directly, and not necessarily mechanically. The terms "a" and "an" are defined as one or more unless stated otherwise. The terms "comprise" (and any form of comprise, such as "comprises" and "comprising"), "have" (and any form of have, such as "has" and "having"), "include" (and any form of include, such as "includes" and "including") and "contain" (and any form of contain, such as "contains" and "containing") are open-ended linking verbs. As a result, a system, device, or apparatus that "comprises," "has," "includes" or "contains" one or more elements possesses those one or more elements but is not limited to possessing only those one or more elements. Similarly, a method or process that "comprises," "has," "includes" or "contains" one or more operations possesses those one or more operations but is not limited to possessing only those one or more operations.

The invention claimed is:

1. A device authenticity validation system comprising:
 a to-be-replaced/repaired device comprising one of a plurality of devices configured in a computing system;
 a replacement/repaired device configured to replace the to-be-replaced/repaired device in the computing system;
 a processor; and
 a memory coupled to the processor, the memory having program instructions stored thereon that, upon execution, cause an Information Handling System (IHS) to:

receive a to-be-replaced public key of the to-be-replaced/repaired device;

sign, using a replacement/repaired device private key of the replacement/repaired device, attestation data associated with the replacement/repaired device;

sign, using a vendor private key of a vendor of the replacement/repaired device, the signed attestation data and a replacement/repaired device public key of the replacement/repaired device; and encrypt, using the received to-be-replaced public key, the signed attestation data and the replacement/repaired device public key; and sign, using a vendor private key, the encrypted data to save into a new voucher that pairs the to-be-replaced/repaired device with the replacement/repaired device.

2. The device authenticity validation system of claim 1, wherein the program instructions, upon execution, further cause the IHS to:

receive the replacement/repaired device and the voucher from the vendor;

decrypt, using a to-be-replaced private key of the to-be-replaced/repaired device, the encrypted data of the signed attestation data and the replacement/repaired device public key; and validate the signed attestation data against the attestation data of the replacement/repaired device using the decrypted replacement/repaired device public key.

3. The device authenticity validation system of claim 2, wherein the acts of decrypting the signed attestation data and validating the signed attestation data are performed by the to-be-replaced/repaired device.

4. The device authenticity validation system of claim 2, wherein the acts of decrypting the encrypted data of the signed attestation data and validating the signed attestation data are performed by the computing system.

5. The device authenticity validation system of claim 2, wherein the acts of decrypting the signed attestation data and validating the signed attestation data are performed by a device that is trusted by a user.

6. The device authenticity validation system of claim 2, wherein the program instructions, upon execution, further cause the IHS to validate the signed attestation data by the end user of the replacement/repaired device, and verify that the signed attestation data has been signed by the vendor public key.

7. The device authenticity validation system of claim 1, wherein the program instructions, upon execution, further cause the IHS to validate the signed attestation data, and verify that the signed attestation data has been signed by the replacement/repaired device private key using the decrypted replacement/repaired device public key.

8. The device authenticity validation system of claim 1, wherein the attestation data comprises at least one of a firmware of the replacement/repaired device, software configured on the replacement/repaired device, and one or more configuration files stored on the replacement/repaired device.

9. The device authenticity validation system of claim 1, wherein the program instructions, upon execution, further cause the IHS to, after the replacement/repaired device is successfully validated into the IHS:

detect that the replacement/repaired device has received a configuration change;

generate a record that indicates the configuration change; and add the generated record to a blockchain.

10. A device authenticity validation method comprising:

receiving a to-be-replaced public key of a to-be-replaced/repaired device comprising one of a plurality of devices configured in a computing system;

signing, using a replacement/repaired device private key of a replacement/repaired device, attestation data associated with the replacement/repaired device, the replacement/repaired device configured to replace the to-be-replaced/repaired device in the computing system;

signing, using a vendor private key of a vendor of the replacement/repaired device, the signed attestation data and a replacement/repaired device public key of the replacement/repaired device; and encrypting, using the received to-be-replaced public key, the signed attestation data and the replacement/repaired device public key; and signing, using a vendor private key, the encrypted data to save into a new voucher that pairs the to-be-replaced/repaired device with the replacement/repaired device.

11. The device authenticity validation method of claim 10, further comprising:

receiving the replacement/repaired device and the voucher from the vendor;

decrypting, using a to-be-replaced private key of the to-be-replaced/repaired device, the encrypted data of the signed attestation data and the replacement/repaired device public key; and validating the signed attestation data against the attestation data of the replacement/repaired device using the decrypted replacement/repaired device public key.

12. The device authenticity validation method of claim 11, further comprising performing the acts of decrypting the encrypted data of the signed attestation data and validating the signed attestation data by the to-be-replaced/repaired device.

13. The device authenticity validation method of claim 11, further comprising performing the acts of decrypting the signed attestation data and validating the signed attestation data by the computing system.

14. The device authenticity validation method of claim 11, further comprising performing the acts of decrypting the signed attestation data and validating the signed attestation data by a device that is trusted by a user.

15. The device authenticity validation method of claim 11, further comprising, to validate the signed attestation data by the end user of the replacement/repaired device, verifying that the signed attestation data has been signed by the vendor public key.

16. The device authenticity validation method of claim 10, further comprising, to validate the signed attestation data, verifying that the signed attestation data has been signed by the replacement/repaired device private key using the decrypted replacement/repaired device public key.

17. The device authenticity validation method of claim 10, further comprising, after the replacement/repaired device is successfully validated into the IHS:

detecting that the replacement/repaired device has received a configuration change;

generating a record that indicates the configuration change; and adding the generated record to a blockchain.

18. A computer program product comprising a non-transitory computer readable storage medium having program instructions stored thereon that, upon execution by an Information Handling System (IHS), cause the IHS to:

receive a to-be-replaced public key of a to-be-replaced/repaired device comprising one of a plurality of devices configured in a computing system;

sign, using a replacement/repaired device private key of a replacement/repaired device, attestation data associated with the replacement/repaired device, the replacement/repaired device configured to replace the to-be-replaced/repaired device in the computing system;

sign, using a vendor private key of a vendor of the replacement/repaired device, the signed attestation data and a replacement/repaired device public key of the replacement/repaired device; and encrypt, using the received to-be-replaced public key, the signed attestation data and the replacement/repaired device public key; and sign, using a vendor private key, the encrypted data to save into a new voucher that pairs the to-be-replaced/repaired device with the replacement/repaired device.

19. The computer program product of claim 18, wherein the program instructions, upon execution, further cause the IHS to:

receive the replacement/repaired device and the voucher from the vendor;

decrypt, using a to-be-replaced private key of the to-be-replaced/repaired device, the encrypted data of the signed attestation data and the replacement/repaired device public key; and validate the signed attestation data against the attestation data of the replacement/repaired device using the decrypted replacement/repaired device public key.

20. The computer program product of claim 18, wherein the program instructions, upon execution, further cause the IHS to validate the signed attestation data by the end user of the replacement/repaired device, and verify that the signed attestation data has been signed by the vendor public key.

* * * * *